(12) United States Patent
Narippatta et al.

(10) Patent No.: US 11,996,884 B1
(45) Date of Patent: May 28, 2024

(54) DUAL MARKER BASED LATENCY MEASUREMENT

(71) Applicant: Infinera Corporation, San Jose, CA (US)

(72) Inventors: Vinod Narippatta, Bangalore (IN); Ting-Kuang Chiang, Saratoga, CA (US); Tulasi Veguru, Sunnyvale, CA (US); Scott Pringle, Ottawa (CA)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 17/527,102

(22) Filed: Nov. 15, 2021

Related U.S. Application Data

(60) Provisional application No. 63/113,975, filed on Nov. 15, 2020.

(51) Int. Cl.
*H04B 10/079* (2013.01)
*H04B 10/40* (2013.01)
*H04L 49/90* (2022.01)

(52) U.S. Cl.
CPC ......... *H04B 10/0795* (2013.01); *H04B 10/40* (2013.01); *H04L 49/90* (2013.01)

(58) Field of Classification Search
None
See application file for complete search history.

(56) References Cited

U.S. PATENT DOCUMENTS

| | | | | | |
|---|---|---|---|---|---|
| 5,793,772 A | * | 8/1998 | Burke | ................ | H04L 12/2801 370/519 |
| 8,189,487 B1 | * | 5/2012 | Mateski | ................ | H04L 43/50 370/242 |
| 8,718,482 B1 | * | 5/2014 | Roberts | ................ | H04B 10/27 398/53 |
| 2009/0059928 A1 | * | 3/2009 | Enomoto | ................ | H04L 45/24 370/394 |
| 2009/0310500 A1 | * | 12/2009 | Matsuda | ............ | H04L 43/0864 370/252 |
| 2010/0195517 A1 | * | 8/2010 | Kihara | ................ | H04L 43/0852 370/252 |

(Continued)

FOREIGN PATENT DOCUMENTS

WO  WO2020091650  *  5/2020  ............ H04W 56/00

*Primary Examiner* — Nathan M Cors
(74) *Attorney, Agent, or Firm* — David L. Soltz

(57) ABSTRACT

Systems, methods, devices, and other implementations for minimizing latency asymmetries and variations in a bi-directional link between two nodes in a communication system are described. To determine a variable latency for communication between two network nodes, a transmitting node can insert a line marker and a client marker into the data to be transmitted to the receiving node. The line marker and client marker can be inserted into the data at different portions or by different components of a transmitter. The receiving node can receive the transmitted data and extract the line marker and client marker. A delay associated with the line and client markers ($T_c - T_L$) in the transmission device and a delay between the reception of the line and clien markers ($R_c - R_L$) at the receiving node can be used to determine the variable latency.

18 Claims, 7 Drawing Sheets

(56) References Cited

U.S. PATENT DOCUMENTS

2013/0322872 A1* 12/2013 Jobert .................. H04J 3/0682
398/25
2017/0302431 A1* 10/2017 Lugthart ................ H04L 5/14
2020/0028585 A1* 1/2020 Abdullah ............. H04L 7/0075
2022/0007235 A1* 1/2022 Liu .................. H04W 28/0236

* cited by examiner

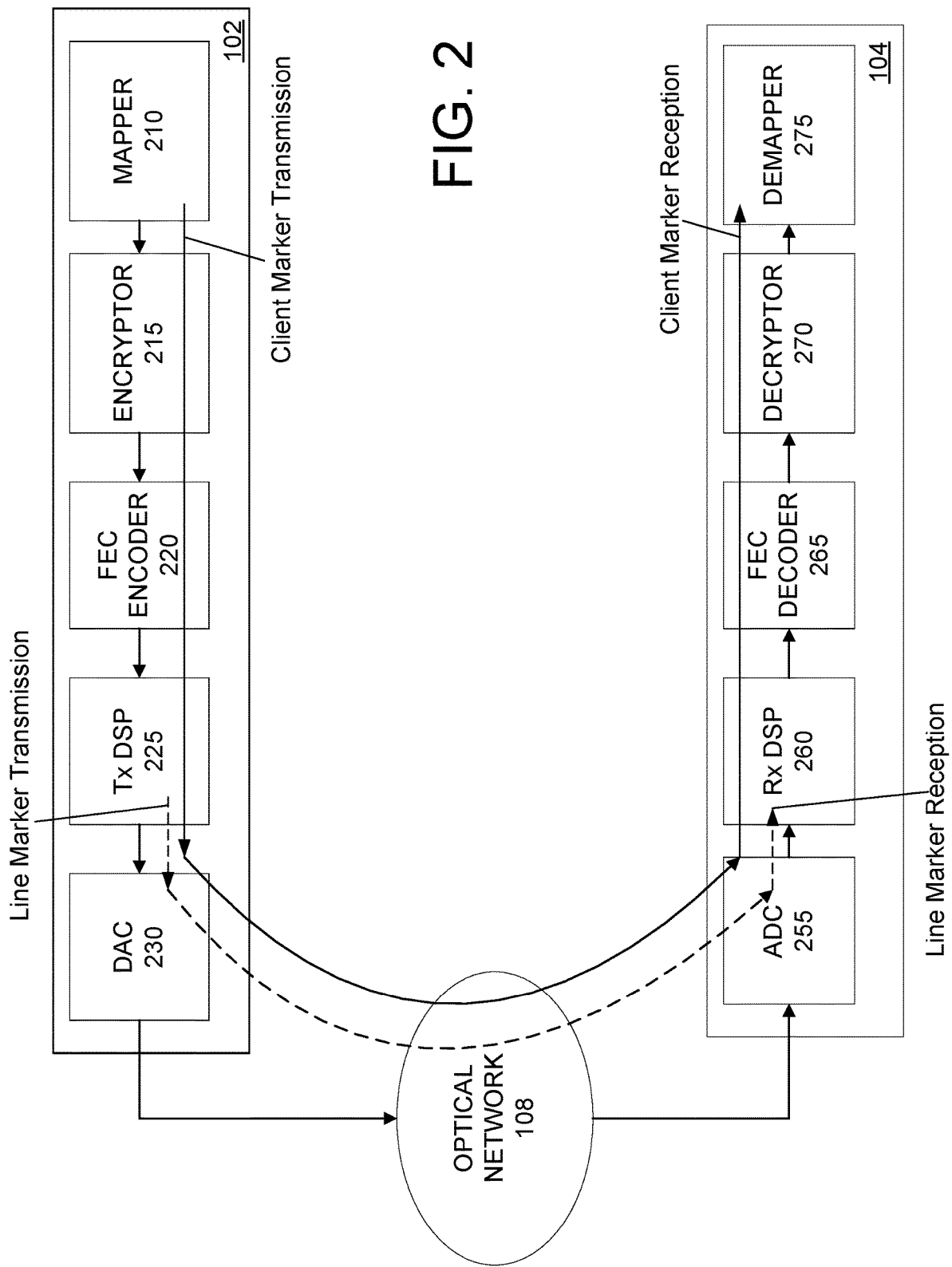

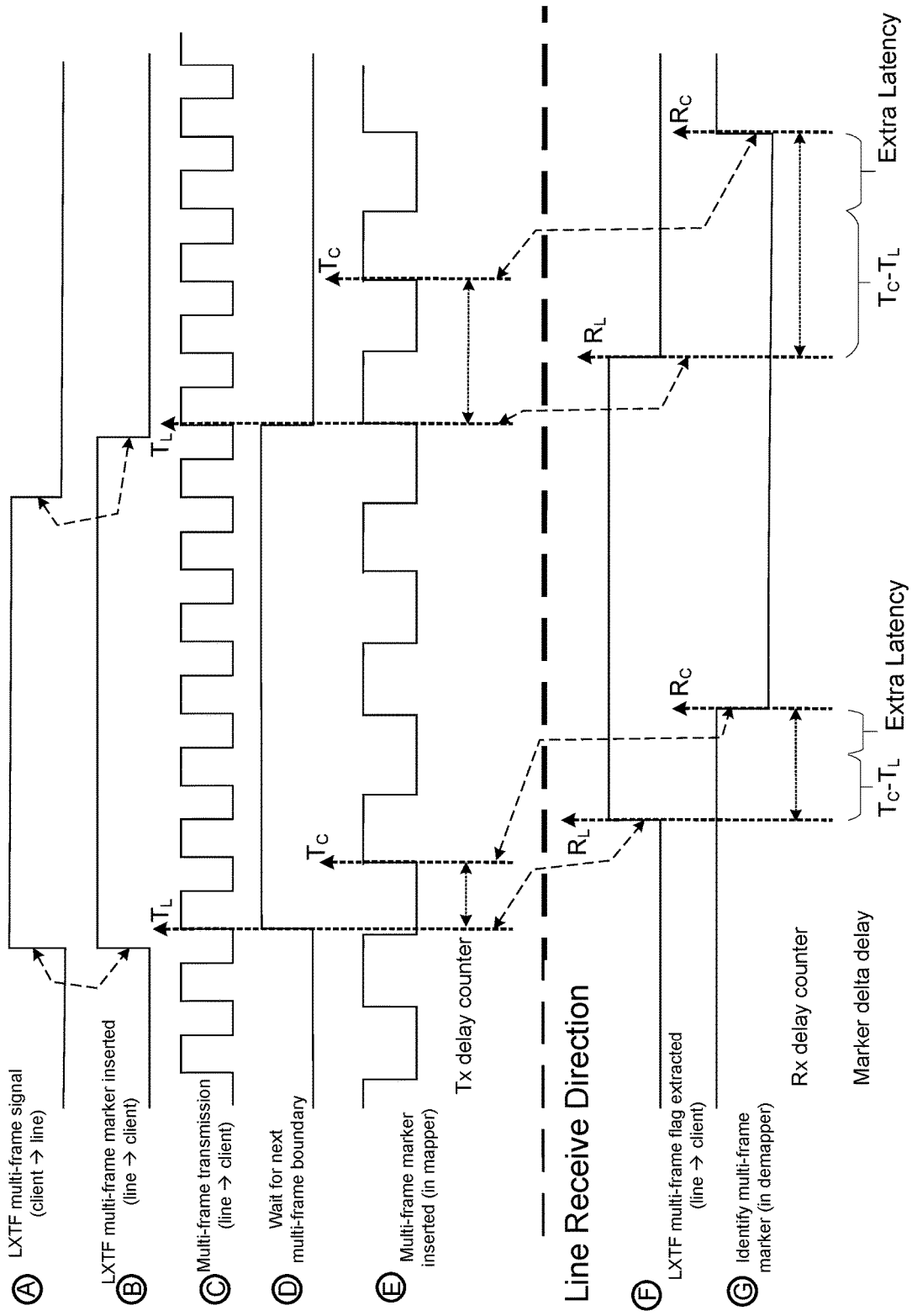

DUAL MARKER BASED LATENCY MEASUREMENT

CROSS-REFERENCE TO RELATED APPLICATION

This application claims the benefit of U.S. Provisional Application No. 63/113,975, filed Nov. 15, 2020, which is incorporated herein by reference in its entirety.

FIELD OF THE DISCLOSURE

This specification generally relates to latency estimation and compensation in optical communication systems and networks.

BACKGROUND

Nodes (e.g., computer devices) in an optical communications network can exchange information using one or more of optical links. Data packets transmitted across a bi-directional link between the two or more network nodes may experience latency assymetries, which can result in packet loss, network synchronization issues and, more generally, reduce the efficiency of communications over a network.

SUMMARY

This disclosure describes systems, methods, devices, and other implementations for minimizing latency asymmetries and variations in a bi-directional link between two nodes in a communication system.

When data is transmitted from one node to another in a communication system, the transmitting node can insert a line marker and a client marker into the data to be transmitted to the receiving node. The line marker and client marker can be inserted into the data at different portions or by different components of a transmitter. The receiving node can receive the transmitted data and extract the line marker and client marker.

A delay or interval period between the transmission of the line and client markers (Tc-$T_L$) is calculated at the transmitting node and a delay or interval period between the reception of the line and client markers (Rc-$R_L$) is calculated at the receiving node. The calculated delays can be used to obtain the variable latency in the bidirectional link between the transmitting and receiving nodes. Various suitable variable latency compensation techniques can be used to compensate for the estimated variable latency.

According to some aspects, a communication system including a first network node and a second network node is disclosed. The first network node is operable to set values for a first set of one or more bits in a first packet and a second set of one or more bits in a second packet to determine a transmitter interval period. The second network node is coupled to the first network node through an optical communication network. The second network node is operable to receive the first packet and the second packet and to determine a receiver interval period based on the first set of one or more bits in the first packet and the second set of one or more bits in a second packet. The first network node or the second network node is operable to determine a variable latency based on the transmitter interval period and the receiver interval period, and to modify transmission of subsequent data based on the variable latency.

Implementations of these aspects can include one or more of the following features.

In some implementations, to set values for the first set of one or more bits in the first packet, the first network node is operable to toggle a predetermined set of bits in a header of the first packet. In addition, to set values for the second set of one or more bits in the second packet, the first network node is operable to toggle a predetermined set of bits in a header of the second packet.

In some implementations, the transmitter interval period corresponds to a time difference between when the first set of one or more bits in the first packet and the second set of one or more bits in the second packet are transmitted to the second network node.

In some implementations, the second network node is operable to transmit data indicative of the receiver interval period to the first network node, or the second network node is operable to receive data indicative of the transmitter interval period from the first network node.

In some implementations, the second network node is operable to detect the first set of one or more bits in the first packet, trigger a counter in response to detecting the first set of one or more bits in the first packet, and detect the second set of one or more bits in the second packet. In response to detecting the second set of one or more bits in the second packet, the second network node is operable to terminate the counter and determine the receiver interval period based on a count of the counter between the detection of the second set of one or more bits in the second packet and the detection of the first set of one or more bits in the first packet.

In some implementations, the values for the first set of one or more bits in the first packet and the second set of one or more bits in the second packet are set by different components of the first network node.

In some implementations, the communication system further comprises a transmitter digital signal processor and a mapper. The values for the first set of one or more bits in the first packet are set by the transmitter digital signal processor. The values for the second set of one or more bits in the second packet are set by the mapper after the values for the first set of one or more bits in the first packet are set.

In some implementations, the mapper is operable to trigger a counter to count in response to setting the values for the first set of one or more bits in the first packet. The first network node is operable to terminate the counter and determine the transmitter interval period based on a count of the counter.

In some implementations, the first network node is a hub node, and the second network node is a leaf node.

In some implementations, the hub node is coupled to a plurality of leaf nodes including the second network node and a third network node. The hub node is configured to communicate with the second network node using a first subcarrier. The hub node is configured to communicate with the third network node using a second subcarrier different from the first subcarrier. The variable latency associated with communications between the hub node and the second network node using the first subcarrier is different from a second variable latency associated with communications between the hub node and the third network node using the second subcarrier.

In some implementations, the first network node is operable to delay or advance a readout of data from a FIFO buffer in the first network node to modify transmission of subsequent data based on the variable latency.

According to some aspects, an optical network device including one or more processors and one or more computer memory devices interoperably coupled with the one or more processors and having tangible, non-transitory, machine-readable media storing one or more instructions are disclosed. The one or more instructions, when executed by the one or more processors, cause the one or more processors to perform operations. The operations include determining a first variable latency for communication with a first network device based on insertion of two or more markers in two or more packets, respectively, that are transmitted to the first network device, and modifying a timing of subsequent data transmissions to the first network device to compensate for the first variable latency.

Implementations of these aspects can include one or more of the following features.

In some implementations, the instructions, when executed by the one or more processors, further cause the one or more processors to perform operations including determining the first variable latency for communication with the first network device using a first subcarrier, and determining a second variable latency for communication with a second network node using a second subcarrier different from the first subcarrier.

In some implementations, a first marker of the two or more markers is located in a header of a first packet of the two or more packets, and a second marker of the two or more markers is located in a header of a second packet of the two or more packets.

In some implementations, the first marker is a toggled bit in the header of the first packet, and the second marker is a toggled bit in the header of the second packet.

In some implementations, the optical network device includes a transceiver configured to receive data indicative of a receiver interval period from the first network device. The instructions, when executed by the one or more processors, further cause the one or more processors to perform operations including determining a transmitter interval period associated with the optical network device, and determining a variable latency for communications with the first network device based, at least in part, on a difference between the receiver interval period and the transmitter interval period.

In some implementations, the optical network device is a network hub configured to communicate with a plurality of devices corresponding to leaf nodes. Each of the leaf nodes is associated with a respective subcarrier and is configured to communicate with the network hub using the associated subcarrier.

In some implementations, the optical network device includes a transceiver operable to receive data indicative of a receiver interval period from one or more leaf nodes. The instructions, when executed by the one or more processors, further cause the one or more processors to perform operations including determining a transmitter interval period associated with the optical network device for communications with each of the one or more leaf nodes, and, for each of the one or more leaf nodes, determining a variable latency based on the receiver interval period and transmitter interval period.

In some implementations, the two or more markers in the two or more packets correspond to a first set of one or more predetermined bits toggled in a first packet, and a second set of one or more predetermined bits toggled in a second packet. The first set of one or more predetermined bits and the second set of one or more predetermined bits are toggled by different components within the optical network device.

According to some aspects, a method is disclosed. The method includes determining a variable latency for communication from a network hub to a first network device based on insertion of two or more markers in two or more packets, respectively, that are transmitted to the first network device, and reconfiguring subsequent data transmissions to the first network device from the network hub based on the variable latency to compensate for the variable latency.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 depicts a block diagram of an example communication using line and client markers between two nodes in a communication system.

FIG. 5 depicts a timing diagram corresponding to an example communication using line and client markers between two nodes in a communication system.

Like reference numbers and designations in the various drawings indicate like elements.

DETAILED DESCRIPTION

Figure 1A:
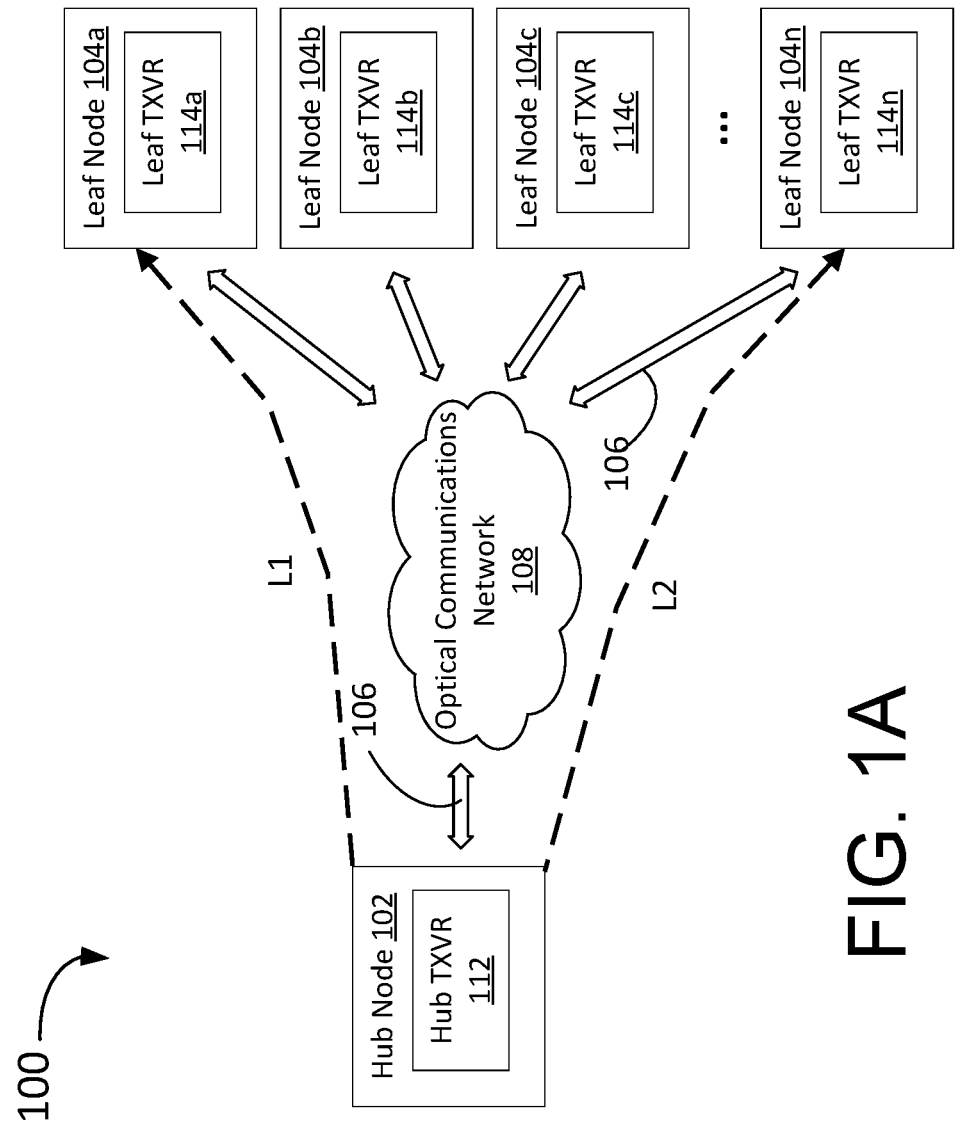
FIGS. 1A and 1B are illustrations of an example communication system including network nodes and an optical communications network.
Figure 1B:
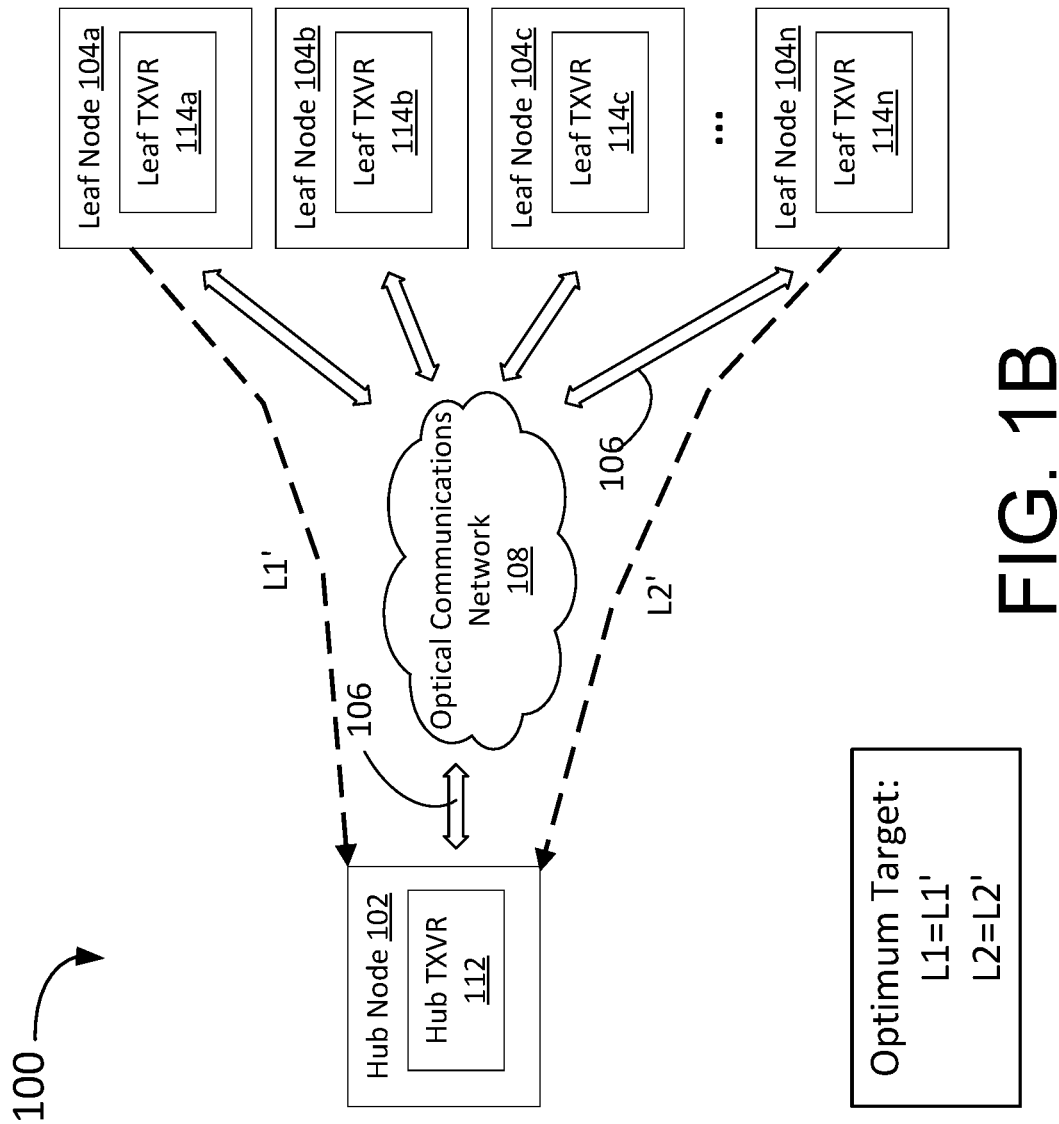

FIGS. 1A and 1B show an example communication system 100. The communication system 100 can be a wired and/or wireless communication system, and, in some implementations, can include an optical communication network 108. The communication system 100 can be a point-to-point communication system or a point-to-multi-point communication system. For example, communication system 100 includes a hub node 102 and leaf nodes 104a-104n that are communicatively coupled to one another by optical links 106 in an optical communication network 108. In some implementations, the system 100 and/or the optical communications network 108 can be a part of one or more optical transport networks (OTNs), and/or can include one or more OTNs.

Each of the network nodes 102 and 104a-104n can include one or more respective computer devices (e.g., server computers, client computers, laptop, desktop). In some implementations, the network nodes can be configured such that each of the network nodes transmits data to and/or receives data from one or more other network nodes. As an example, the hub node 102 can be configured to transmit data to and/or receive data from one or more of the leaf nodes 104a-104n. For instance, hub node 102 can transmit data over an optical link to leaf node 104a and transmit data over another optical link to leaf node 104n. System 100 can include any number of network nodes greater than one (e.g., two, three, four, or more).

In FIGS. 1A and 1B, each of the network nodes 102 and 104a-104n includes one or more transceivers for transmitting and/or receiving data via the optical links 106 and the optical communications network 108. As an example, the hub node 102 can include a hub transceiver 112 that is coupled to one or more optical links 106. As another example, each of the leaf nodes 104a-104n can include a respective leaf transceiver 114a-114n that is coupled to one or more of the optical links 106.

In some implementations, the hub transceiver 112 and/or the leaf transceiver 114a-114n can be pluggable devices that are configured to enhance the functionality of the network nodes 102 and 104a-104n. For example, at least some of the hub transceiver 112 and/or the leaf transceiver 114a-114n can include a physical communications interface (e.g., a plug or socket) that is configured to reversibly insert into and/or receive corresponding physical communications interface of a network node 102 or 104a-104n, and exchange information with that network node to facilitate the performance of the operations described herein.

As shown in FIGS. 1A and 1B, the network nodes 102 and 104a-104n are communicatively coupled to one another by optical links 106 extending between them. Each of the optical links 106 can be implemented using one or more lengths of optical fiber and/or equipment interconnecting the optical fiber (e.g., line system components). In some implementations, the optical links 106 can collectively define at least a portion of the optical communications network 108.

In some implementations, a network node can transmit data by generating optical signals that are modulated according to one or more optical subcarriers that are associated with the intended destination or destinations of the data. For example, the hub node 102 can receive data packets (e.g., from the hub node 102 itself and/or from another network node), ascertain the intended destination of each of the data packets, and identify one or more respective optical subcarriers that can be used to transmit data to each of those destinations. Based on this information, the hub node 102 can generate one or more optical signals (e.g., using one or more light emitters, such as laser emitters), modulate the optical signals according to the identified optical subcarriers (e.g., using one or more local oscillators, multiplexers, etc.), and transmit the modulated optical signals over one or more optical links to each of the intended destinations (e.g., one or more of the leaf nodes 104-104n).

The hub node 102 includes several components including a hub transceiver 112 that can generate one or more optical signals, and transmit the optical signals (e.g., via one or more egress network interfaces) to an optical splitter/combiner of the optical communications network 108. For example, hub transceiver 112 can generate an optical signal that is modulated according to multiple sets of optical subcarriers (e.g., SC Groups 1-4), where each set of optical subcarriers is associated with a different one of the leaf nodes 104a-104n. Further, the hub transceiver 112 can provide the optical signal to the splitter/combiner, which splits the optical signal into several power-divided instances of the optical signal. Each of the power-divided instances of the optical signal can be transmitted to a respective one of the leaf nodes 104a-104n (e.g., via an optical link 106).

In some implementations, at least some of the ingress network interfaces can include an Ethernet interface, an OTN interface, and/or a Serializer/Deserializer (SerDes) interface. Further, at least some of the egress network interfaces can include a SerDes interface.

Each of the leaf nodes 104a-104n can receive a respective instance of the optical signal, and selectively demodulate that instance of the optical signal according to the set of optical subcarriers to which it is assigned (e.g., to recover the data that is intended for it). Further, each of the leaf nodes 104a-104n can selectively ignore, block, or otherwise not demodulate the respective optical signal according to the sets of optical subcarriers to which it is not assigned (e.g., such that it refrains from recovering the data that is not intended for it).

In the example system 100, when data is transmitted across bi-directional links to different network nodes and over different subcarriers, the data may incur different levels of latency. For example, as shown in FIG. 1A, data transmitted from hub node 102 to leaf node 104a can experience a latency delay of L1. Data transmitted from hub node 102 to leaf node 104n over the same or different subcarrier can experience a latency delay of L2. In the opposite direction, as shown in FIG. 1B, data received by hub node 102 from leaf node 104a can experience a latency delay of L1', and data received by hub node 102 from leaf node 104n can experience a latency delay of L2'. Under ideal circumstances, the latency delay for data going in any direction over a bidirectional link should be the same, e.g., L1 should equal L1' and L2 should equal L2'. However, in many scenarios, the latency delay experienced for data transmitted in one direction does not equal the latency delay experienced for data transmitted in the opposite direction, i.e., L1≠L1' and L2 ≠L2'.

The mismatch in latency can be attributed to several factors, including, for example, the configuration of buffers, such as First-In-First-Out (FIFO) buffers, used to transmit and/or receive data. For instance, when data is to be sent from one node to another, the data is buffered in a FIFO buffer. The FIFO buffer can introduce latency delays due, in part, to the time it takes to read and configure a signal using the buffered data. And, if multiple FIFO buffers are used, the latency delays can get further exasperated due to the aggregate effect of the delays introduced by the multiple FIFO buffers. This disclosure describes systems and method for estimating the latency delay and performing compensation for the estimated latency delay.

Figure 1C:
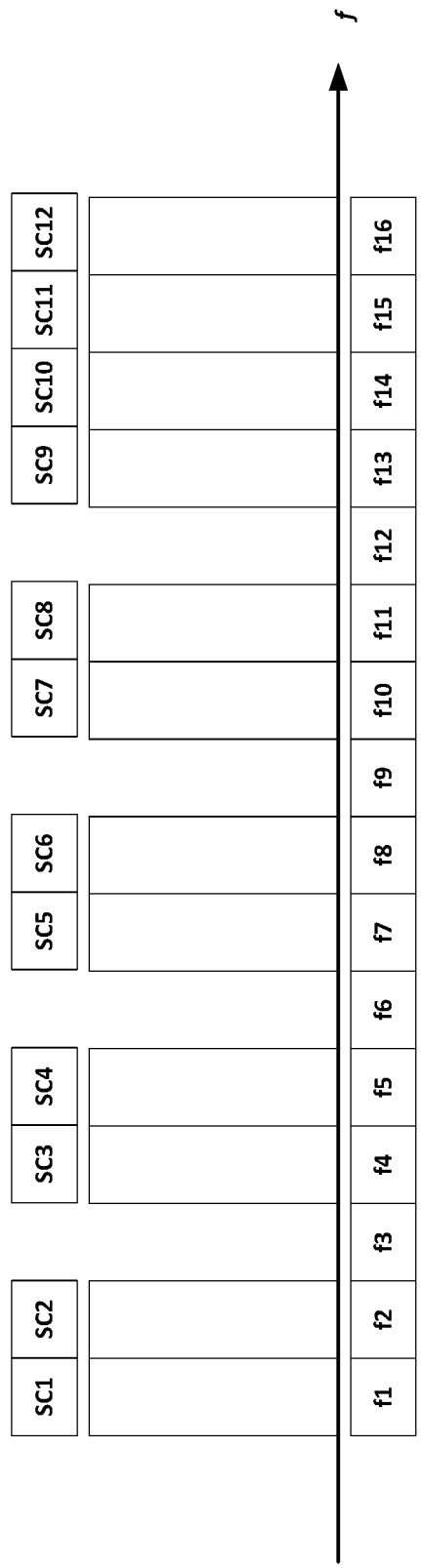
FIG. 1C is a diagram of optical subcarriers depicted over a frequency domain spectrum.

FIG. 1C shows example sets of optical subcarriers SC1-SC16 that may be made available for use by the hub node 102 and the leaf nodes 104a-104n. In this example, the optical subcarriers SC1-SC16 (corresponding to frequencies f1-f16) are available for exchanging data between the hub node 102 and the leaf nodes 104a-104n. Further, each of the optical subcarriers SC1-SC16 are spectrally contiguous with respect to the frequency domain (e.g., the frequencies f1-f16 define a continuous range of frequencies).

In an example configuration, the hub node 102 and the leaf node 104a can be assigned the optical subcarrier SC1 for exchanging data between them. Further, the hub node 102 and the leaf node 104b can be assigned the optical subcarrier SC2 for exchanging data between them. Further still, the hub node 102 and the leaf node 104c can be assigned the optical subcarrier SC3 for exchanging data between them. The other optical subcarriers can be assigned in a similar manner to facilitate the exchange of data between other pairings of the hub node 102 and the leaf nodes.

In some implementations, a single optical subcarrier can be allocated to transmit data between two respective network nodes. In some implementations, multiple optical subcarriers (e.g., two, three, four, or more) can be allocated to transmit data between two respective network nodes.

In some implementations, at least some of the subcarriers described herein can be Nyquist subcarriers. A Nyquist subcarrier is a group of optical signals, each carrying data, where (i) the spectrum of each such optical signal within the group is sufficiently non-overlapping such that the optical signals remain distinguishable from each other in the frequency domain, and (ii) such group of optical signals is generated by modulation of light from a single laser. In general, each subcarrier may have an optical spectral bandwidth that is at least equal to the Nyquist frequency, as determined by the baud rate of such subcarrier.

Although FIG. 1C shows an example configuration of twelve optical subcarriers, FIG. 1C is merely an illustrative example. In general, various number of optical subcarriers can be used by the network nodes 102 and 104a-104n to exchange data. Further, some, none, or all of optical subcarriers can be spectrally contiguous with one another with respect to the frequency domain. Further, some, none, or all of optical subcarriers can be spectrally separated from one another with respect to the frequency domain (e.g., such that one or more guard bands are positioned spectrally between adjacent optical subcarriers in the frequency domain).

As described above, in some implementations, the hub node 102 and leaf nodes 104a-104n can include optical communication transceivers for communicating across an optical communications network 108. An example implementation of a transmitter in a hub node 102 and a receiver in a leaf node 104 is shown in FIG. 2. Although FIG. 2 depicts transmitter components in the hub node 102 and receiver components in the leaf node 104, the hub node 102 can also include other components such as receiver components and the leaf node can also include other components such as transmitter components.

As shown in FIG. 2, the hub node 102 can include a mapper 210, an encryptor 215, a forward error correction (FEC) encoder 220, a transmitter (Tx) Digital Signal Processor (DSP) 225, and a Digital-to-Analog Converter (DAC) 230. The leaf node 104 can include a demapper 275, a decryptor 270, a FEC decoder 265, a receiver (Rx) DSP 260, and an Analog-to-Digital Converter (ADC) 255. Other components such as antennas, interleavers, modulators, memory devices such as buffers, and other processing units may be included, but are not shown.

Mapper 210 can receive data or client payload information and perform bit-to-symbol mapping to output symbol streams such that each symbol in a given symbol stream corresponds to a particular bit sequence in a corresponding data stream. The number of data streams may correspond to the number of subchannels over which data is to be transmitted to the leaf nodes. In some implementations, each leaf node 104 may be allocated a subchannel. In some implementations, a leaf node 104 may be allocated two or more subchannels for communications with the hub node 102.

The mapper 210 can provide the symbol streams to encryptor 215 and FEC encoder 220 to perform encryption and encoding on the symbols. Encryptor 215 can use one or more suitable encryption methods and keys to encrypt data and enhance the security of data to be transmitted through the optical network 108. For instance, various types of symmetric or asymmetric key algorithms can be used to encrypt data. The FEC encoder 220 can be implemented as a circuit that encodes symbols in accordance with one or more suitable FEC codes, e.g., block codes, convolutional codes.

The Tx DSP receives the encoded and encrypted symbol data and performs additional processing. The Tx DSP 225 can be implemented as a combination of hardware and software and can include various processing delay circuits, buffer circuits, Fast Fourier Transform (FFT) circuits, and chromatic dispersion (CD) circuits.

In the Tx DSP 225, one or more delay circuits can receive a symbol stream, apply a delay, and output a respective symbol stream to one or more buffer circuits, preferably without any gaps or interruptions in the such symbol stream. The buffer circuits can temporarily store data and provide a respective output to a corresponding one of FFT circuits, each of which converts data output from the buffer circuits from the time domain to the frequency domain. Such conversion to the frequency domain can advantageously reduce power consumption compared to when operations are performed in the time domain.

The frequency domain outputs from the FFT circuits can be subject to chromatic dispersion (CD) compensation by CD compensation circuits, such as finite-impulse response filters. In some implementations, the CD compensation circuits can supply outputs to transmit side multiple-input multiple output (Tx MIMO) circuits. The MIMO circuits can include compensation circuitry (e.g., filters) configured to correct impairments associated with the analog path variations. Each Tx MIMO circuit can output pairs of data streams, each pair being associated with a corresponding pair of subcarriers.

In some implementations, data from the Tx MIMO circuits can be provided to a multiplexer, which combines and supplies the data streams at a common output. The combined data streams can be provided to an inverse FFT circuit (IFFT), which converts the data streams into the time domain. The output of the IFFT can be provided to a buffer circuit (e.g., a first-in-first-out (FIFO) buffer), which can supply data to DAC 230. The DAC 230 can be implemented as one or more DACs and can convert the digital data (e.g., symbol stream) to analog signals and provide the analog signals to a modulator that can supply the multiplexed signal with multiple subcarriers to an optical communication path or link in the optical network 108.

In a point-to-multipoint communication system such as the one illustrated in FIGS. 1A and AB, each leaf node 104a-104n can be allocated a particular subchannel and subcarrier. The allocation can be made in pairs. For example, leaf node 104a can be allocated a subchannel SCH0 associated with subcarrier 0. Leaf node 104n (if n=3) can be allocated a subchannel SCH3 associated with subcarrier 3. Leaf node 104b can be allocated a subchannel SCH1 associated with subcarrier 1. Leaf node 104c can be allocated a subchannel SCH2 associated with subcarrier 2.

After traversing the optical communication path or link, the transmitted signal (including subcarriers therein) may be received by a receiver in leaf node 104 (which represents any one of leaf nodes 104a-104n). The receiver can include a polarization beam splitter (PBS), optical hybrid circuits, and photodetectors (not shown). These components are operable to receive a polarization multiplexed optical signal, separate the signal into X (TE) and Y (TM) orthogonal polarizations, mix the orthogonal polarizations using 90-degree optical hybrid circuits with light from a local oscillator (LO) laser, and convert the mixed light to electrical signals using the photodetectors. Electrical signals output by the photodetectors are provided to the ADC 255, which can be implemented as one or more ADCs.

ADC 255 can convert the analog signals into corresponding series of digital samples that are provided to a receiver (Rx) DSP 260. The Rx DSP 260 can further process the digital samples and output them to the FEC decoder 265. The FEC decoder 265 can decode the digital samples, e.g., according to the encoding algorithm used by FEC encoder 220. The decoded samples can be decrypted by decryptor 270 and provided to the demapper 275, which can demap the symbols to bits and output streams of bits or data sequences.

When data is transmitted from hub node 102 to leaf node 104 in the above-described manner, data transmissions may experience fixed and/or variable latency. In a round trip, latency may arise due to the generation, recovery, and transmission of data at a device, such as when reading data from FIFO buffers or other processing operations executed in the network nodes, and due to delays in the optical path through network 108. For data transmitted back and forth between two network nodes over a bi-directional link, the latency over the optical path is relatively stable and thus can be considered to have a relatively fixed value. However, substantial variable latency can be introduced by components, such as FIFOs, within the network nodes. Such variable latency can create significant problems such as packet loss and processing lags.

To minimize variable latency, markers can be included in transmitted data packets to determine the variable latency and apply suitable compensation consistent with the determined or estimated variable latency. For example, as shown in FIG. 2, the Tx DSP 225 can configure a header of a packet to include a line marker, and subsequently a mapper 210 can configure a header of a packet to include a client marker. The markers are transmitted through an optical link in the optical network 108 and to the leaf node 104 where the line marker is detected by the Rx DSP 260 and the client marker is detected by the demapper 275. The hub node 102 can determine a time difference between when the line marker was inserted and when the client marker was inserted. The leaf node 104 can determine a time difference between when the line marker was detected by the Rx DSP 260 and when the client marker was detected by the demapper 275. The two time differences can be used to determine a marker delta delay value.

Figure 3:
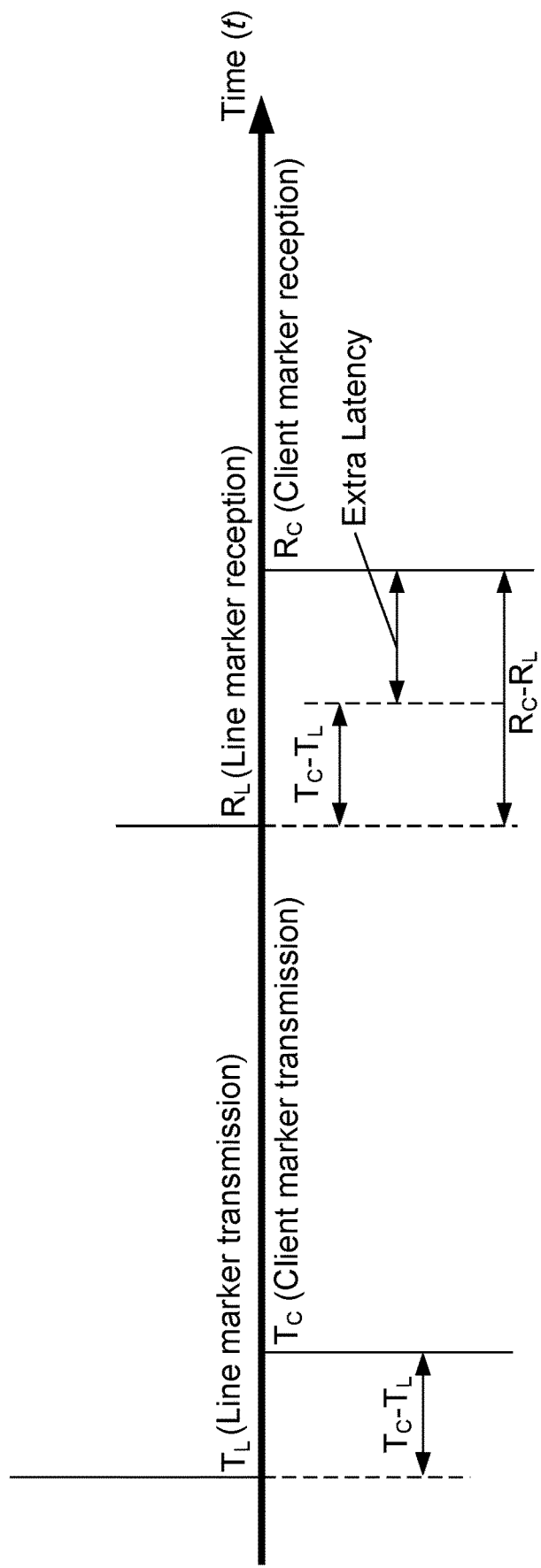
FIG. 3 depicts a timing diagram illustrating the timing of line and client markers at a transmitting device and a receiving device.

For instance, as shown in FIG. 3, the delay between the transmission of the line and client markers ($T_C$-$T_L$) is determined at the hub node 102. Data indicative of the delay on the transmission side is shared with the leaf node 104, which separately calculates the delay between the reception of the line and client markers ($R_C$-$R_L$). The difference between the reception delay between the client/line markers ($R_C$-$R_L$) and their transmission delay ($T_C$-$T_L$) provides a measure of the extra time that the client side marker takes to transit between its transmission point and reception point with reference to the line-side marker's transit time. This difference can be referred to as MarkerDeltaDelay.

In some implementations, a delay, referred to as MarkerDeltaDelay$_{Max}$, can be introduced on the transmission side in the hub node 102. The difference between the MarkerDeltaDelayMax and the real-time calculated MarkerDeltaDelay can provide a measure of the variable latency introduced through the hub node 102 by the datapath between the line marker and client marker insertion and extraction points.

In some implementations, this real-time variable latency measure can be used to compensate for any variable latency calculated, for example, by delaying the data output through a FIFO buffer so that, at the output of the FIFO buffer, the leaf node 104 realizes the maximum possible latency. In some implementations, the variable latency can be used to compute the delay asymmetry between the two paths of a bidirectional link.

Figure 4:
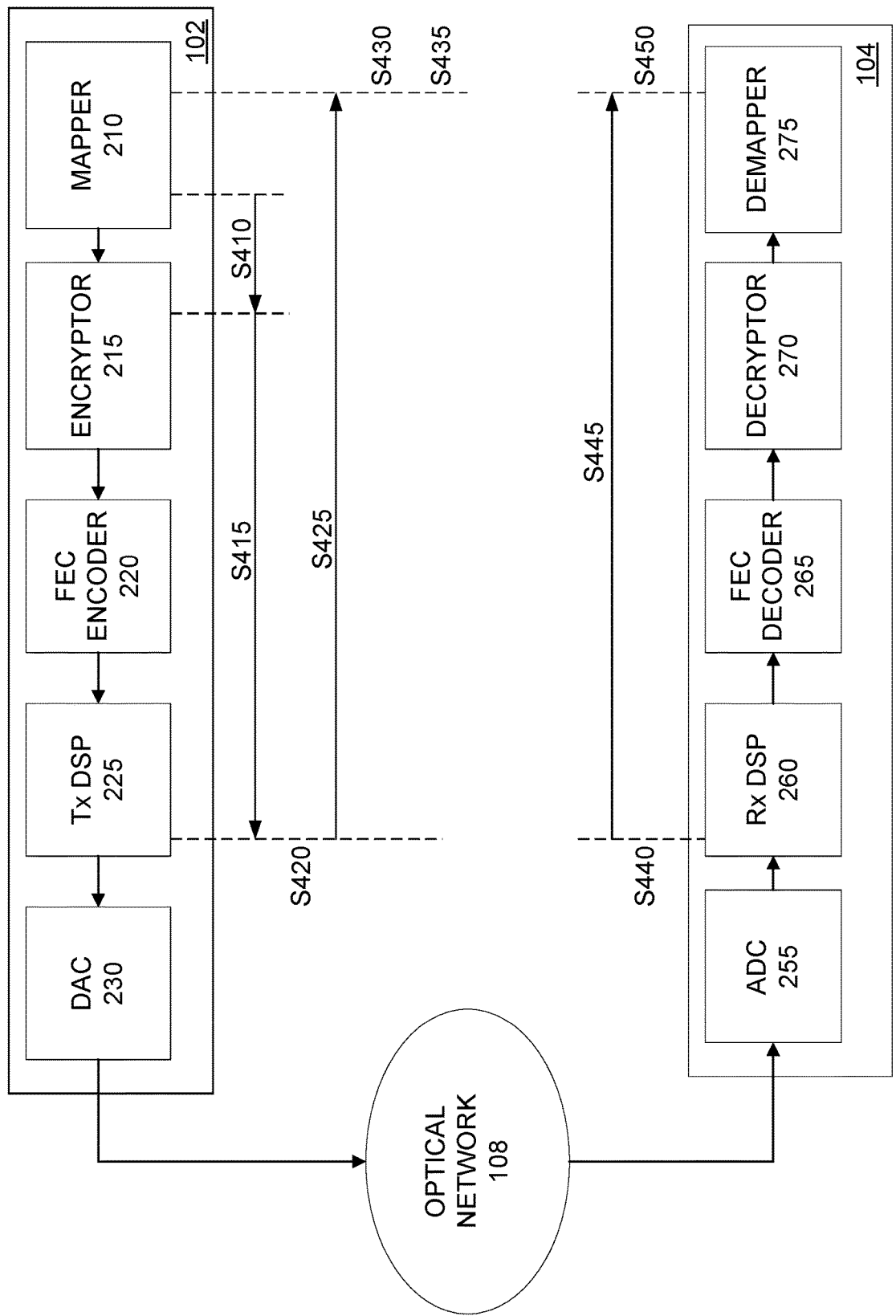
FIG. 4 depicts a diagram of operations executed for an example communication using line and client markers between two nodes in a communication system.

Although the example provided above describes the line marker being configured by the Tx DSP 225 and the client marker being configured by a mapper 210, the client and line markers may also be configured by other components in some implementations. For instance, the client marker can be configured at various points in the transmission path/line within the hub node 102, e.g., between mapper 210 and the FEC encoder 220. The line marker can also be configured at different points in the transmission path/line within the hub node 102. In some implementations, the line marker can be configured at a component close to the DAC 230, such as the Tx DSP 225, as shown in FIG. 2. By increasing the distance between the points at which the client and line markers are introduced, a greater portion of the chip datapath in the hub node 102 can be covered and factored into the variable latency measurements FIG. 4 depicts a set of operations that are part of a frame transmit function ("LXTF") implemented by the hub node 102 and leaf node 104. The operations can be implemented, for example, by the components shown in FIG. 4 or can be executed by one or more processors in the hub node 102 and leaf node 104 coupled to the components shown in FIG. 4.

When the LXTF is executed, a latency measurement can be triggered by generating a LXTF marker multi-frame signal (S410). The LXTF marker multi-frame signal can be provided to a DAC interface, such as the Tx DSP 225, along with the datapath as an out-of-band signal (S415). The LXTF marker multi-frame signal corresponds to a start of an LXTF frame and may have a periodicity. The periodicity can be variably set.

The Tx DSP 225 can wait for the next line-FEC multi-frame boundary at which point the line delay marker bit can be inserted (S420). To insert the line delay marker, a set of one or more bits (can also be referred to as a LXTF multi-frame flag) in a header of a packet can be toggled. The set of one or more bits can be predetermined or allocated bits in a packet header. Different line delay marker bits can be inserted for each subcarrier used to communicate data to a leaf node.

The Tx DSP 225 can notify the mapper 210 that the line delay marker has been inserted or the LXTF multi-frame flag has been set (S425). The notification can also include data indicating (i) the time when data with the inserted line marker (e.g., a line-FEC multi-frame) is transmitted from hub node 102 to the optical network 108, and (ii) a periodicity of the transmitted data (e.g., line-FEC multi-frame). In some implementations, the frame periodicity may be about 40 microseconds. In general, the line-FEC multi-frame may have one of various suitable periods.

In response to receiving this notification, the mapper 210 can store the information received in the notification in a storage device coupled to the mapper 210 and can initiate a Tx delay counter (S430). The Tx delay counter can continue incrementing its count until a time when the next transcode multi-frame boundary is reached. In some implementations, the boundary can be configured according to a preset multi-frame indicator count value. For instance, the Tx delay counter or another frame counter can increment its value after each frame is received or processed. When the counter reaches the preset multi-frame indicator count value, the boundary is reached.

When the transcode multi-frame boundary is reached, the mapper 210 can insert a client marker (S435). To insert the client marker, a set of one or more predetermined or allocated bits in a header of a packet can be toggled. Different client marker bits can be inserted for each subcarrier used to communicate data to a leaf node. The count of the Tx delay counter indicates a time difference between when the line marker was inserted and when the client marker was inserted. When the client marker is inserted, a value of the count of the Tx delay counter is stored and the counter value is reset to zero. The value of the count can also be transmitted to the leaf node 102 to which the data including the line and client markers are sent.

The leaf node 104 receives data from the hub node 102 and processes the data as it is received (S440). As part of the processing, the Rx DSP 260 can detect when a line marker is received by detecting the toggled LXTF multi-frame flag. In response to detecting the line marker, the Rx DSP 260 can send a notification signal to the demapper 275 indicating that the line marker has been received (S445). The demapper 275 can then initiate a Rx delay counter (S450). The Rx delay counter can continue incrementing its count until a time when the client marker is received. In some implementations in which communication between the nodes is performed over multiple subcarriers, the first line delay marker received can be used to trigger the Rx delay counter.

The leaf node 104 can then wait until it identifies a client delay marker in a packet received from the hub node 102. When the client delay marker is received, a value of the Rx delay counter is stored and the Rx delay counter is reset to zero (S450). The value of the Rx delay counter indicates a time difference between when the line marker was received and when the client marker was received. After storing the value of the Rx delay counter, the leaf node 104 may obtain the value of the Tx delay counter from the hub node 102 and determine the variable latency as described above.

In the foregoing description of FIGS. 2-5, example implementations were described. However, several other variations of these implementations can also be used without departing from the scope of this disclosure. For example, the order of components in FIGS. 2 and 4 within the nodes can be rearranged or one or more of the components may be omitted. The operations described above with respect to the DSPs, mappers, and demappers related to the insertion and detection of markers can also be performed by other components such as processors and controllers. For example, the insertion of a client marker by mapper 210 can, in some implementations, be performed by a processor or controller that is connected to a Tx delay counter and receives information related to the insertion of the line marker.

Furthermore, information regarding the counter values or delay times can be exchanged between the nodes such that the variable latency can be determined at the hub node 102 or the leaf node 104. Although the description provided above provides details for example communications between a leaf node and a hub node, the same techniques and methods can be applied to determine variable latency between any two nodes, e.g., between one hub node and another hub node, or between one leaf node and another leaf node. The above-described method can also be reversed such that, in some implementations, the markers are inserted by a leaf node and received by a hub node.

FIG. 5 illustrates a timing diagram of the signals described above with respect to FIGS. 2-4. For example, FIG. 5 illustrates signals corresponding to: when a pulse signals the triggering of a LXTF marker multi-frame signal (A), when a line marker is inserted (B), when a multi-frame transmission to another node begins (C), when the hub node 102 waits for the next mapper multi-frame boundary or transcode multi-frame boundary (D), and when the client marker is inserted (E) in the transmitter/hub node 102. FIG. 5 also illustrates signals corresponding to: when the leaf node 104 receives and identifies a line marker (F) and when the leaf node 104 receives and identifies a client marker (G).

After the variable latency is determined, one or both nodes involved can implement one or more measures to compensate or minimize the determined variable latency. Some of the measures include, but are not limited to, adjusting the FIFO min-max threshold to trigger FIFO centering, modifying the read out rate from a FIFO buffer to trigger FIFO centering, and increasing or decreasing delays in the datapath in the leaf node or hub node. Because FIFO buffers involved in mapping and smoothening of data can be significant contributors to the variable latency, the configurations of such FIFO buffers can be modified to apply variable latency compensation and improve communications between network nodes. In this manner, variable latency in subsequent data transmissions can be improved or minimized.

While this specification contains many specifics, these should not be construed as limitations on the scope of the disclosure or of what may be claimed, but rather as descriptions of features specific to particular implementations. Certain features that are described in this specification in the context of separate implementations may also be combined. Conversely, various features that are described in the context of a single implementation may also be implemented in multiple implementations separately or in any suitable sub-combination. Moreover, although features may be described above as acting in certain combinations and may even be claimed as such, one or more features from a claimed combination may, in some cases, be excised from the combination, and the claimed combination may be directed to a sub-combination or variation of a sub-combination. For example, although the mapping operation is described as a series of discrete operations, the various operations may be divided into additional operations, combined into fewer operations, varied in order of execution, or eliminated, depending on the desired implementation. Similarly, the separation of various system components in the implementations described above should not be understood as requiring such separation in all implementations.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, some or all of the components described herein can be implemented using digital electronic circuitry, or in computer software, firmware, or hardware, or in combinations of one or more of them. In another example, one or more of the operations described above can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium also can be, or can be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows also can be performed by, and apparatus also can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

A computer system may include a single computing device, or multiple computers that operate in proximity or remote from each other and typically interact through a communication network. Examples of communication networks include a local area network ("LAN") and a wide area network ("WAN"), an inter-network (e.g., the Internet), and peer-to-peer networks (e.g., ad hoc peer-to-peer networks). A relationship of client and server may arise by virtue of computer programs running on the respective computers and having a client-server relationship to each other.

Terms used herein and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together. The term "and/or" is also intended to be construed in this manner.

The use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements.

Various modifications can be made to the foregoing examples. Accordingly, other implementations also are within the scope of the claims.

What is claimed is:

1. A communication system comprising:
   a first network node operable to set values for a first set of one or more bits in a first packet and a second set of one or more bits in a second packet to determine a transmitter interval period; and a second network node coupled to the first network node through an optical communication network, the second network node operable to receive the first packet and the second packet and to determine a receiver interval period based on the first set of one or more bits in the first packet and the second set of one or more bits in a second packet, wherein the first network node or the second network node is operable to determine a variable latency based on the transmitter interval period and the receiver interval period, and to modify transmission of subsequent data based on the variable latency, and wherein, to set values for the first set of one or more bits in the first packet, the first network node is operable to toggle a predetermined set of bits in a header of the first packet, and to set values for the second set of one or more bits in the second packet, the first network node is operable to toggle a predetermined set of bits in a header of the second packet.

2. The communication system of claim 1, wherein the transmitter interval period corresponds to a time difference between when the first set of one or more bits in the first packet and the second set of one or more bits in the second packet are transmitted to the second network node.

3. The communication system of claim 1, wherein:
the second network node is operable to transmit data indicative of the receiver interval period to the first network node; or
the second network node is operable to receive data indicative of the transmitter interval period from the first network node.

4. The communication system of claim 1, wherein the first node includes a digital signal processor.

5. The communication system of claim 1, wherein:
the first network node is a hub node; and
the second network node is a leaf node.

6. The communication system of claim 1, wherein the first network node is operable to delay or advance a readout of data from a FIFO buffer in the first network node to modify transmission of subsequent data based on the variable latency.

7. A communication system comprising:
a first network node operable to set values for a first set of one or more bits in a first packet and a second set of one or more bits in a second packet to determine a transmitter interval period; and
a second network node coupled to the first network node through an optical communication network, the second network node operable to receive the first packet and the second packet and to determine a receiver interval period based on the first set of one or more bits in the first packet and the second set of one or more bits in a second packet,
wherein the first network node or the second network node is operable to determine a variable latency based on the transmitter interval period and the receiver interval period, and to modify transmission of subsequent data based on the variable latency,
wherein the second network node is operable to:
detect the first set of one or more bits in the first packet;
trigger a counter in response to detecting the first set of one or more bits in the first packet;
detect the second set of one or more bits in the second packet; and
in response to detecting the second set of one or more bits in the second packet, terminate the counter and determine the receiver interval period based on a count of the counter between the detection of the second set of one or more bits in the second packet and the detection of the first set of one or more bits in the first packet.

8. A communication system comprising:
a first network node operable to set values for a first set of one or more bits in a first packet and a second set of one or more bits in a second packet to determine a transmitter interval period; and
a second network node coupled to the first network node through an optical communication network, the second network node operable to receive the first packet and the second packet and to determine a receiver interval period based on the first set of one or more bits in the first packet and the second set of one or more bits in a second packet,
wherein the first network node or the second network node is operable to determine a variable latency based on the transmitter interval period and the receiver interval period, and to modify transmission of subsequent data based on the variable latency,
wherein the values for the first set of one or more bits in the first packet and the second set of one or more bits in the second packet are set by different components of the first network node.

9. The communication system of claim 8, further comprising a transmitter digital signal processor and a mapper, wherein:
the values for the first set of one or more bits in the first packet are set by the transmitter digital signal processor; and
the values for the second set of one or more bits in the second packet are set by the mapper after the values for the first set of one or more bits in the first packet are set.

10. The communication system of claim 9, wherein:
the mapper is operable to trigger a counter to count in response to setting the values for the first set of one or more bits in the first packet; and
the first network node is operable to terminate the counter and determine the transmitter interval period based on a count of the counter.

11. A communication system comprising:
a first network node operable to set values for a first set of one or more bits in a first packet and a second set of one or more bits in a second packet to determine a transmitter interval period; and
a second network node coupled to the first network node through an optical communication network, the second network node operable to receive the first packet and the second packet and to determine a receiver interval period based on the first set of one or more bits in the first packet and the second set of one or more bits in a second packet,
wherein the first network node or the second network node is operable to determine a variable latency based on the transmitter interval period and the receiver interval period, and to modify transmission of subsequent data based on the variable latency,
wherein: the first network node is a hub node,
the second network node is a leaf node, and wherein:
the hub node is coupled to a plurality of leaf nodes including the second network node and a third network node;
the hub node is configured to communicate with the second network node using a first subcarrier;

the hub node is configured to communicate with the third network node using a second subcarrier different from the first subcarrier; and the variable latency associated with communications between the hub node and the second network node using the first subcarrier is different from a second variable latency associated with communications between the hub node and the third network node using the second subcarrier.

12. An optical network device comprising:
one or more processors; and
one or more computer memory devices interoperably coupled with the one or more processors and having tangible, non-transitory, machine-readable media storing one or more instructions that, when executed by the one or more processors, cause the one or more processors to perform operations comprising:
  determining a first variable latency for communication with a first network device based on insertion of two or more markers in two or more packets, respectively, that are transmitted to the first network device; and
modifying a timing of subsequent data transmissions to the first network device to compensate for the first variable latency,
wherein the instructions, when executed by the one or more processors, further cause the one or more processors to perform operations comprising:
determining the first variable latency for communication with the first network device using a first subcarrier, and
determining a second variable latency for communication with a second network node using a second subcarrier different from the first subcarrier.

13. The optical network device of claim 12, wherein:
a first marker of the two or more markers is located in a header of a first packet of the two or more packets; and
a second marker of the two or more markers is located in a header of a second packet of the two or more packets.

14. An optical network device comprising:
one or more processors; and
one or more computer memory devices interoperably coupled with the one or more processors and having tangible, non-transitory, machine-readable media storing one or more instructions that, when executed by the one or more processors, cause the one or more processors to perform operations comprising:
  determining a first variable latency for communication with a first network device based on insertion of two or more markers in two or more packets, respectively, that are transmitted to the first network device; and
modifying a timing of subsequent data transmissions to the first network device to compensate for the first variable latency,
wherein:
a first marker of the two or more markers is located in a header of a first packet of the two or more packets; and
a second marker of the two or more markers is located in a header of a second packet of the two or more packets, and wherein:
the first marker is a toggled bit in the header of the first packet; and
the second marker is a toggled bit in the header of the second packet.

15. An optical network device comprising:
one or more processors; and
one or more computer memory devices interoperably coupled with the one or more processors and having tangible, non-transitory, machine-readable media storing one or more instructions that, when executed by the one or more processors, cause the one or more processors to perform operations comprising:
  determining a first variable latency for communication with a first network device based on insertion of two or more markers in two or more packets, respectively, that are transmitted to the first network device;
modifying a timing of subsequent data transmissions to the first network device to compensate for the first variable latency; and
a transceiver configured to receive data indicative of a receiver interval period from the first network device,
wherein the instructions, when executed by the one or more processors, further cause the one or more processors to perform operations comprising:
  determining a transmitter interval period associated with the optical network device; and
  determining a variable latency for communications with the first network device based, at least in part, on a difference between the receiver interval period and the transmitter interval period.

16. The optical network device of claim 12, wherein:
the optical network device is a network hub configured to communicate with a plurality of devices corresponding to leaf nodes, each of the leaf nodes being associated with a respective subcarrier and being configured to communicate with the network hub using the associated subcarrier.

17. An optical network device comprising:
one or more processors; and
one or more computer memory devices interoperably coupled with the one or more processors and having tangible, non-transitory, machine-readable media storing one or more instructions that, when executed by the one or more processors, cause the one or more processors to perform operations comprising:
  determining a first variable latency for communication with a first network device based on insertion of two or more markers in two or more packets, respectively, that are transmitted to the first network device;
modifying a timing of subsequent data transmissions to the first network device to compensate for the first variable latency, wherein the optical network device is a network hub configured to communicate with a plurality of devices corresponding to leaf nodes, each of the leaf nodes being associated with a respective subcarrier and being configured to communicate with the network hub using the associated subcarrier; and
a transceiver operable to receive data indicative of a receiver interval period from one or more leaf nodes,
wherein the instructions, when executed by the one or more processors, further cause the one or more processors to perform operations comprising:
  determining a transmitter interval period associated with the optical network device for communications with each of the one or more leaf nodes; and
  for each of the one or more leaf nodes, determining a variable latency based on the receiver interval period and transmitter interval period.

18. An optical network device comprising:
one or more processors; and
one or more computer memory devices interoperably coupled with the one or more processors and having tangible, non-transitory, machine-readable media storing one or more instructions that, when executed by the one or more processors, cause the one or more processors to perform operations comprising:

determining a first variable latency for communication with a first network device based on insertion of two or more markers in two or more packets, respectively, that are transmitted to the first network device;

modifying a timing of subsequent data transmissions to the first network device to compensate for the first variable latency, wherein:

the two or more markers in the two or more packets correspond to a first set of one or more predetermined bits toggled in a first packet, and a second set of one or more predetermined bits toggled in a second packet; and the first set of one or more predetermined bits and the second set of one or more predetermined bits are toggled by different components within the optical network device.

* * * * *